United States Patent [19]

Boileau

[11] 4,286,645
[45] Sep. 1, 1981

[54] PNEUMATIC TIRE WITH REINFORCED CARCASS AND TREAD

[75] Inventor: Jacques Boileau, Clermont-Ferrand, France

[73] Assignee: Compagnie Generale des Etablissements Michelin, Clermont-Ferrand, France

[21] Appl. No.: 50,309

[22] Filed: Jun. 20, 1979

Related U.S. Application Data

[63] Continuation of Ser. No. 748,498, Dec. 8, 1976, abandoned, which is a continuation-in-part of Ser. No. 650,665, Jan. 20, 1976, abandoned, which is a continuation of Ser. No. 476,443, Jun. 5, 1974, abandoned.

[30] Foreign Application Priority Data

Jun. 12, 1973 [FR] France .............................. 73 21397
Mar. 11, 1976 [FR] France .............................. 76 07055

[51] Int. Cl.³ .......................... B60C 9/20; B60C 9/04
[52] U.S. Cl. ................................. 152/360; 152/361 R;
152/361 FP; 152/361 DM; 152/330 R;
152/354 RB; 152/356 A; 156/123 R
[58] Field of Search ........ 152/354 R, 354 RB, 356 R,
152/356 A, 360, 361 R, 361 FP, 361 DM, 330
R; 156/110 R, 123 R

[56] References Cited

U.S. PATENT DOCUMENTS

| 2,493,614 | 1/1950 | Bourdon ............... 152/356 |
| 3,327,753 | 6/1967 | Travers ................ 152/356 |
| 3,357,470 | 12/1967 | Massoubre ............ 152/361 FP |
| 3,404,721 | 10/1968 | Massoubre ............ 152/361 FP |
| 3,422,874 | 1/1969 | Weitzel ................ 156/123 |
| 3,481,386 | 12/1969 | Menell et al. ........ 152/354 |
| 3,515,197 | 6/1970 | Boileau ............... |
| 3,525,377 | 8/1970 | Mennell et al. ...... |
| 3,556,891 | 1/1971 | Martinkovic et al. ...... 152/354 |
| 3,568,749 | 3/1971 | Menell et al. ........ 152/354 |
| 3,580,318 | 5/1971 | Menell et al. ........ 152/354 |
| 3,580,319 | 5/1971 | Gorter et al. ........ 152/361 |
| 3,616,832 | 11/1971 | Takeo Shima et al. ....... 152/361 |
| 3,692,080 | 9/1972 | Boileau ............... 152/359 |
| 3,717,191 | 2/1973 | Harrington et al. ...... 152/361 |
| 3,756,883 | 9/1973 | Gay ...................... 156/123 |
| 3,799,233 | 9/1974 | Cappa .................. 152/361 R |

FOREIGN PATENT DOCUMENTS 1811061 2/1970 Fed. Rep. of Germany ........... 152/361
0907045 10/1962 United Kingdom ..................... 152/361

Primary Examiner—John T. Goolkasian
Assistant Examiner—L. E. Boland
Attorney, Agent, or Firm—Brumbaugh, Graves, Donohue & Raymond

[57] ABSTRACT

The reinforcement of a pneumatic tire comprises, proceeding in a direction from the inside towards the outside of the tire, a carcass reinforcement continuous from bead to bead and three superimposed plies of cords limited to the region of the tread. In the sidewalls of the tire, the cords of the carcass reinforcement form a substantially constant angle with the circumferential direction of the tire of between 70° and 90°. In the tread region of the tire, the cords of the carcass reinforcement form an angle with the circumferential direction of the tire which is smaller than the angle made by those cords in the sidewalls. The cords of the three tread plies form acute angles $\alpha$, $\beta$, and $\gamma$, respectively, with the circumferential direction, and the cord angle $\alpha$ of the one of the three tread plies nearest the carcass reinforcement and the cord angles $\beta$ and $\gamma$ of the second and third of the three plies, respectively, are related as set forth below in mathematical expressions.

10 Claims, 15 Drawing Figures

PNEUMATIC TIRE WITH REINFORCED CARCASS AND TREAD

CROSS REFERENCE TO RELATED APPLICATIONS

This is a continuation, of application Ser. No. 748,498, filed Dec. 8, 1976, which in turn was a continuation-in-part of applicant's application Ser. No. 650,665, filed on Jan. 20, 1976, which was in turn a continuation of Applicant's Prior application Ser. No. 476,443, filed on June 5, 1974, all now abandoned.

BACKGROUND OF THE INVENTION

This invention relates to pneumatic tires and, more particularly, to a novel and highly-effective improvement of the tires which are disclosed in U.S. Pat. No. 3,327,753, assigned to the assignee of the present invention.

The reinforcement of such tires comprises a carcass ply of cords, cables or threads that are continuous from bead to bead and that are radial in the sidewalls and oblique in the region of the tread. In the region of the tread the reinforcement comprises, in addition to the oblique portion of the carcass ply, another ply of oblique cords or threads, the latter cords or threads being crossed with respect to the oblique cords or threads of the carcass ply and limited to the region of the tread.

Such a reinforcement is easy to manufacture and offers the advantage of ensuring a continuous connection of the reinforcement of the sidewalls to that of the tread. Furthermore, the sidewalls have the same flexibility as tires with a completely radial carcass—that is, a carcass that is radial from bead to bead. Under certain conditions, the tread of such tires needs additional reinforcement. This is why the patent provides for the reinforcement thereof by the addition of at least one other ply of oblique cords or threads limited to the region of the tread. This addition is possible, however, only after the shaping of the basic reinforcement defined above. On the other hand, the fundamental structure of these tires is extended without difficulty to the use of at least one ply which is continuous from bead to bead but the orientation of the cords or threads of which may differ by as much as 20° from the radial orientation in the sidewalls, while retaining a definitely oblique portion in the region of the tread.

SUMMARY OF THE INVENTION

An object of the present invention is to provide a reinforcement for the tread of tires of the general type described above which exhibits satisfactory behavior under all conditions of travel and which permits the shaping of the cylindrical tire blank after its completion.

The invention is based on an analysis of the stresses acting on an isolated unit parallelogram in the tread reinforcement. This unit parallelogram by convention has a diagonal of unit length parallel to the circumferential direction; moreover, the opposite parallel sides are chosen to be parallel to the cords or threads of a pair of crossed oblique tread plies. In such a parallelogram the tension stresses acting along the circumferential direction result in compressive stresses on the other diagonal. Cords or threads in general react unfavorably to axial compressive stresses. Axial compressive stresses of cords are avoided in accordance with the present invention, which introduces a new principle of rigidification of the tread reinforcement. In accordance with the present invention, the compressive stresses act transversely on the cords or threads of a third tread ply, they being arranged in a direction that differs by at most 30° from the perpendicular to the nonlongitudinal diagonal of the unit parallelogram.

The reinforcement of a tire according to the invention comprises, from the inside to the outside, at least one carcass ply of cords or threads that are continuous from bead to bead and that form with the circumferential direction a substantially constant angle of between 70° and 90° in the sidewalls and, in the region of the tread, an angle less than that formed by the cords or threads in the sidewalls, and three superimposed plies of oblique cords or threads limited to the area of the tread, the cords of these three plies intersecting at angles of $\alpha$, $\beta$ and $\gamma$, respectively, with respect to the circumferential direction. The tire is characterized in that the cord angle $\alpha$ of the crown ply adjacent the carcass ply is related to the cord angles $\beta$ and $\gamma$ of the following crown plies in a special manner explained in detail below.

In accordance with the principle of the invention, the rigidifying action is due especially to the ply of cord angle $\alpha$. The principle of rigidification in accordance with the invention makes it possible advantageously to reduce the total cross section of the cords or threads per unit of width of the ply of cord angle $\alpha$, they being essentially stressed transversely, for example by decreasing the number of cords or threads or their individual cross section.

Moreover, since the rigidification ply directly caps the carcass ply, the rigidification ply also stabilizes the inclination of the cords or threads of the underlying zone of the carcass ply, as will be explained in more detail below.

As to the cord angles $\beta$ and $\gamma$, they are generally less than 45°, and preferably between 15° and 35°, with respect to the circumferential direction.

The invention includes both the case where the cord angles $\beta$ and $\gamma$ are of opposite sign and the case where they are of the same sign. The positive sign applies to angles measured in the customary trigonometric positive direction (counterclockwise), taking the longitudinal direction as the origin.

In the case where the cord angles $\beta$ and $\gamma$ are of opposite sign, the cord angle $\alpha$ will have the sign of the one of the two cord angles $\beta$ and $\gamma$ that is larger in absolute value. In the case where the cord angles $\beta$ and $\gamma$ are of the same sign, the sign of the cord angle $\alpha$ will always be opposite that of the cord angles $\beta$ and $\gamma$.

A tread reinforcement in accordance with the invention may have edges that are reinforced, for instance by folding the edges of the ply of cord angle $\beta$ around those of the ply of cord angle $\gamma$ (see U.S. Pat. Nos. 3,357,470 and 3,404,721, assigned to the assignee of the present invention). This embodiment is especially well suited for tires intended for high-speed vehicles.

Another embodiment provides for different widths for the three tread plies. Preferably, the ply of cord angle $\alpha$ nearest the carcass ply is chosen as the narrowest ply. Thus the bends of the cords or threads of the carcass ply connecting the segments located in the sidewalls to the segments located under the ply of cord angle $\alpha$ are covered by the protruding areas of the ply of cord angle $\beta$. This embodiment facilitates stabilization of the inclination of the cords or threads of the corresponding area of the carcass reinforcement, for instance when the tire is traveling at high speed. This embodiment may be advantageously combined with a pair of plies having folded edges, such as has just been described.

The invention comprises tires having tread reinforcements of different widths and/or cord angles provided for the different plies, tread reinforcements of asymmetrical effect and/or structure, and partial tread reinforcements juxtaposed with or without connection in the transverse direction.

In order to produce a tire having a structure in accordance with the invention, a complete cylindrical blank is built on a drum. This building comprises placing over a carcass ply which is continuous from one bead to the other the tread plies of cord angles $\alpha$, $\beta$ and $\gamma$ in succession and and then possibly covering this reinforcement with sidewalls and a tread of rubber. The shaping can be effected outside of the vulcanization mold or within it if all the components are put in place, but in any case after completion of the building of the entire reinforcement, leaving a certain mobility if necessary for the beads.

The fundamental principle of the invention in accordance with which the cords or threads of the rigidification ply (of cord angle $\alpha$) are arranged approximately at right angles to the compression stresses resulting from the shaping of the other tread plies (of cord angles $\beta$ and $\gamma$) remains valid. This arrangement also leaves the ply of cord angle $\alpha$ the necessary freedom to modify during the shaping operation the angle of the cords or threads of the underlying portion of the carcass ply.

One preferred embodiment of the process of manufacture of the tire in accordance with the invention comprises arranging the different tread plies in such a manner that the contraction of the unit parallelogram (as defined above) corresponding to the pair of plies of cord angles $\beta$ and $\gamma$ is greater than, or at least equal to, the contraction of the unit parallelogram corresponding to the pair of underlying plies. This pair is formed by the rigidification ply (of cord angle $\alpha$) and by the carcass ply. If the cord angle $\delta$ is applied by convention to the carcass ply, the condition set forth above is expressed by the following relationship between the cord angles of the four plies present in the tread region: $|\tan \alpha| + |\tan \delta| \geq |\tan \beta| + |\tan \gamma|$; or else $$\frac{|\tan \alpha| + |\tan \delta|}{|\tan \beta| + |\tan \gamma|};$$

Preferably the value of the expression is between 1 and 4.

Despite the strengthening of the reinforcement in the tread region, the tires in accordance with the invention provide remarkable comfort. It can be assumed that this is due primarily to the oblique orientation of the segments of the cords or threads of the carcass ply in the region of the tread, but also to the fact that these cords or threads describe two bends which attenuate impacts. In the case of the embodiment in which the tread ply of cord angle $\alpha$ adjacent the carcass ply is narrower than the overlying pair of tread plies of cord angles $\beta$ and $\gamma$, a layer of rubber which is preferably interposed between the protruding portions of the pair of tread plies and the carcass ply also contributes to absorbing impacts coming from the tread. Suitable values for the width of the tread ply adjacent the carcass ply are between 50% and 90% of the average width of the overlying pair of tread plies, the optimum range being about 70% to 75%.

BRIEF DESCRIPTION OF THE DRAWING

A better understanding of the invention can be gained from a consideration of the following detailed description of the preferred embodiment thereof, in conjunction with the appended figures of the drawing, wherein:

FIGS. 1B to 1E are diagrammatic representations of the case where the angles $\beta$ and $\gamma$ are selected with opposite signs, FIGS. 1B and 1C representing the variant wherein $|\beta| > |\gamma|$ and FIGS. 1D and 1E the variant wherein $|\beta| < |\gamma|$;

FIGS. 1F to 1I are diagrammatic representations of the case where the angles $\beta$ and $\gamma$ are selected with the same sign, $|\beta| > |\gamma|$ in FIGS. 1F and 1G and $|\beta| < |\gamma|$ in FIGS. 1E and 1I;

DESCRIPTION OF THE PREFERRED EMBODIMENTS

A method of graphically constructing the cord angle $\alpha$ of the tread ply adjacent the reinforcement of the carcass comprises drawing the unit parallelogram having a diagonal parallel to the longitudinal direction of the tire. For this (FIGS. 1A to 1I), there is selected an arbitrary unit length BC on a straight line parallel to the longitudinal axis x—x (shown in FIGS. 3 and 5 but not in FIGS. 1A to 1I). A straight line BD is drawn from the point B making an acute angle $\beta$ with the diagonal BC, equal to the cord angle of the second tread ply, and then a straight line CD from the point C making an acute angle $\gamma$ with the diagonal BC, equal to the cord angle of the third tread ply. These two straight lines intersect at the point D. The point A, the middle of the segment BC, is then established on the diagonal BC. The second diagonal of the unit parallelogram passes through the points D and A. It is then sufficient to draw through the point A a line N that is perpendicular to the straight line DA. The acute angle which this straight line N makes with the diagonal BC is the desired optimal cord angle $\alpha$. The cords of the tread reinforcement ply nearest the carcass ply may form an angle $\alpha$ with the line N which does not exceed 30°.

Figure 1A:
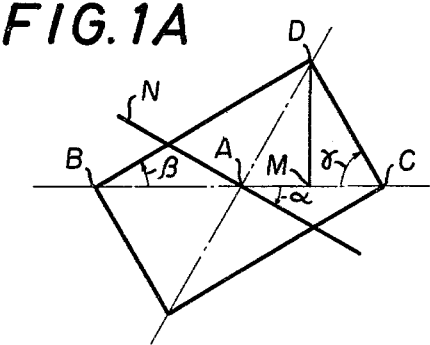
FIGS. 1A to 1I illustrate a graphical method of constructing the cord angle $\alpha$, in value and in sign, of the tread ply adjacent the carcass ply, in accordance with the principle of the invention, the cord angles $\beta$ and $\gamma$ being given.
Figure 1B:
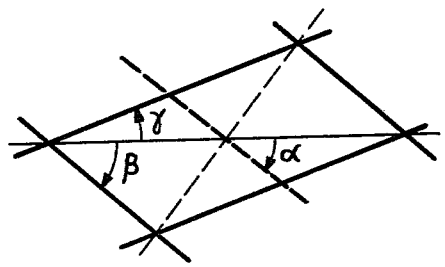
Figure 1C:
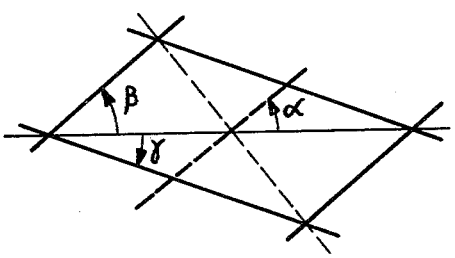

FIGS. 1B to 1E concern the case where the angles $\beta$ and $\gamma$ are selected with opposite signs. There are two variants, depending on whether angle $\beta$ is greater in absolute value (FIGS. 1B and 1C) or smaller (FIGS. 1D and 1E) than the angle $\gamma$, the sign of the angle $\alpha$ being the same as the sign of whichever of the two angles $\beta$ or $\gamma$ is the larger in absolute value. Under these conditions, when β is the larger angle (FIGS. 1B and 1C), the optimal value of the angle α is determined in magnitude and sign by the expression $$\tan \alpha = \epsilon \frac{|\tan \beta| - |\tan \gamma|}{2|\tan \beta| \cdot |\tan \gamma|},$$

the coefficient ε being equal to +1 when β is a positive angle (FIG. 1C) with respect to the circumferential direction and to −1 when β is a negative angle (FIG. 1B).

Figure 1D:
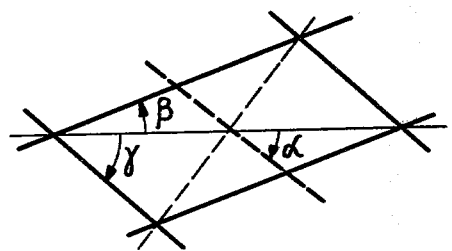
Figure 1E:
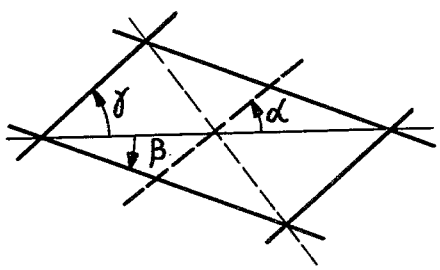
Figure 1F:
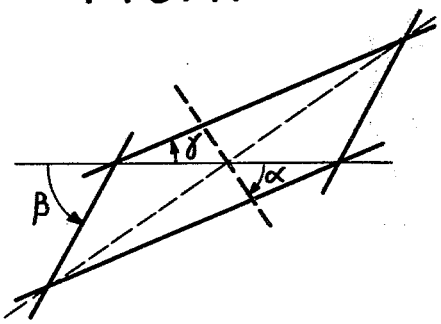

When, on the other hand, β is the smaller angle (FIGS. 1D and 1E), the optimal value of the angle α is determined by the expression $$\tan \alpha = \epsilon \frac{|\tan \gamma| - |\tan \beta|}{2|\tan \beta| \cdot |\tan \gamma|},$$

the coefficient ε being equal to +1 when γ is a positive angle (FIG. 1E) and to −1 when γ is a negative angle (FIG. 1D).

Figure 1G:
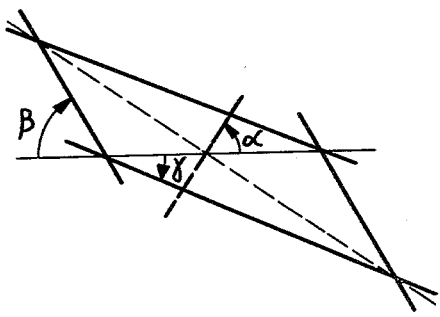
Figure 1H:
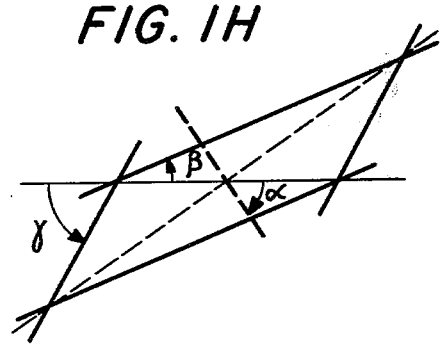
Figure 1I:
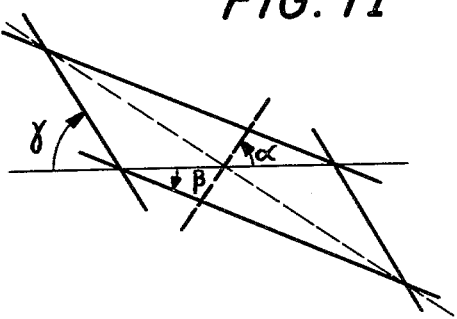

FIGS. 1F to 1I concern the case where the angles β and γ have the same sign, for instance when it is desired to produce an asymmetric tread reinforcement. Whatever the variant, namely: $|\beta| > |\gamma|$ (FIGS. 1F and 1G) or $|\beta| < |\gamma|$ (FIGS. 1H and 1I), the optimal angle α will always be of opposite sign to the common sign of the angles β and γ. Thus the value of tan α is given by the unique relationship, independent of the sign of the angles β and γ, $$\tan \alpha = \epsilon \frac{|\tan \beta| + |\tan \gamma|}{2|\tan \beta| \cdot |\tan \gamma|},$$

the coefficient ε being equal to −1 if β and γ are of positive sign (FIGS. 1F and 1H), and equal to −1 if β and γ are of negative sign (FIGS. 1G and 1I).

In order to express that the principle of the invention extends to the angles between α+30° and α−30°, it is sufficient to indicate in the above relationships that the absolute value of the tangents of these two angular limits is at most equal to $|\tan 30°|$, that is to say at most equal to 0.6.

In the case in which the angles β and γ are of opposite sign, two variants must be distinguished:

The first variant ($|\beta| > |\gamma|$) is expressed by the relationship $$\left| \frac{|\tan \beta| - |\tan \gamma| - 2|\tan \alpha| \cdot |\tan \beta| \cdot |\tan \gamma|}{2|\tan \beta| \cdot |\tan \gamma| + |\tan \alpha|(|\tan \beta| - |\tan \gamma|)} \right| \leq 0.6$$

and the second variant ($|\beta| < |\gamma|$) is expressed by the relationship $$\left| \frac{|\tan \gamma| - |\tan \beta| - 2|\tan \alpha| \cdot |\tan \beta| \cdot |\tan \gamma|}{2|\tan \beta| \cdot |\tan \gamma| + |\tan \alpha|(|\tan \gamma| - |\tan \beta|)} \right| \leq 0.6$$

In the second case, when the angles β and γ are of the same sign, the range of validity corresponds, regardless of the relative values of $|\beta|$ and $|\gamma|$, to the single relationship $$\left| \frac{|\tan \beta| + |\tan \gamma| - 2|\tan \alpha| \cdot |\tan \beta| \cdot |\tan \gamma|}{2|\tan \beta| \cdot |\tan \gamma| + |\tan \alpha|(|\tan \beta| + |\tan \gamma|)} \right| \leq 0.6$$

It is possible for the cord angle α to be selected positive or negative with respect to the circumferential direction, provided that the basic formulas indicated above are complied with.

In order to evaluate the contraction undergone by the unit parallelogram corresponding to the pair of plies of cord angles β and γ, for instance during the shaping of the cylindrical blank of the tire in accordance with the invention, it is sufficient to calculate d(BC)/d(2DM) (FIG. 1A). The expression d(BC) is the differential with respect to β and γ of the length BC of the diagonal parallel to the longitudinal direction of the unit parallelogram; the expression d(2DM) is the differential with respect to β and γ of the width 2DM of the unit parallelogram along the transverse direction, DM being the length of the perpendicular dropped from vertex D onto the diagonal BC. This contraction is equal to −(tan β+tan γ)/2.

It can also be shown that the contraction resulting, for instance, from the shaping of the unit parallelogram corresponding to the pair of plies of cord angles α and δ (these cord angles applying, respectively, to the tread ply adjacent to the carcass ply and to the carcass ply) is equal to −(tan α+tan δ)/2.

The preferred embodiment of the process of manufacturing the tire in accordance with the invention comprises arranging the different plies in such a manner that the contraction of the pair of tread plies of cord angles β and γ is greater than, or at least equal to, that of the pair of plies of cord angles α and δ. By using the relationships set forth above, one arrives at the condition set forth above, namely $|\tan \alpha| + |\tan \delta| \geq |\tan \beta| + |\tan \gamma|$.

Figure 2:
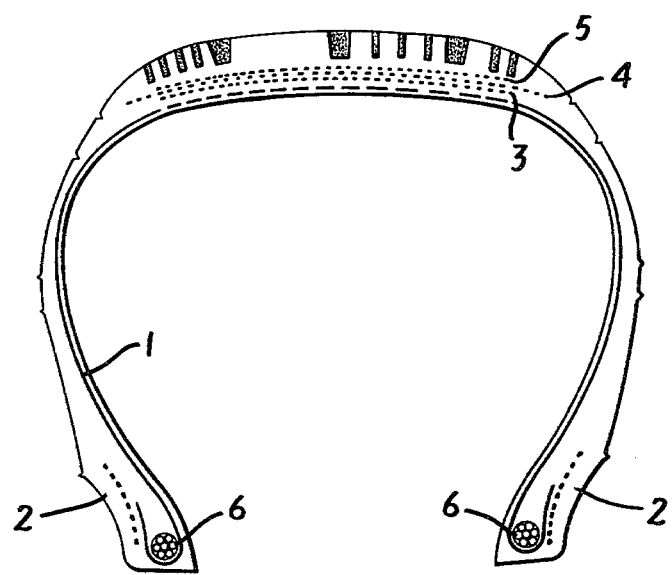
FIG. 2 is a radial section of an exemplary embodiment of a tire in accordance with the invention.
Figure 3:
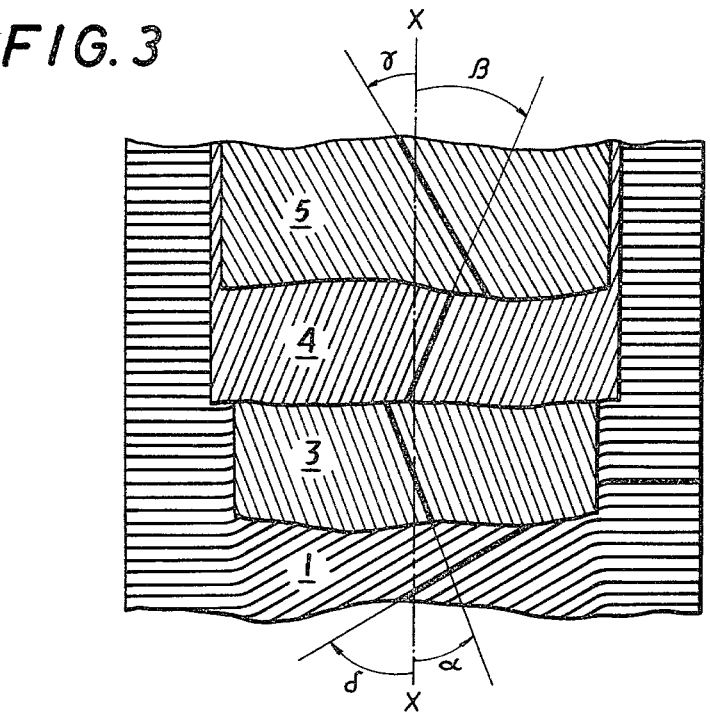
FIG. 3 is a developed plan view of a sector of the reinforcement of the tire of FIG. 2.

FIGS. 2 and 3 show that the reinforcement of a tire in accordance with the invention comprises a continuous carcass ply 1 anchored in beads 2 by being turned around bead wires 6, and three tread plies 3, 4 and 5. FIG. 3 shows that, in this embodiment, the carcass ply 1 has a region located under the tread in which the cords or threads of which it is composed form an angle δ with the longitudinal direction X—X. In the sidewalls, the cords or threads of the carcass ply 1 are, in the example shown, practically radial. The cords or threads of the three tread plies 3, 4 and 5 superimposed in the order of enumeration on the carcass ply 1 form acute angles α, β, γ, respectively, with the longitudinal direction X—X. The ply widths are limited substantially to the width of the tread. In the embodiment described below, the cord angles of the plies 4 and 5 have the following values: β=−16° and γ=+31°, the positive direction being the customary trigonometric positive direction (counterclockwise). The cords of the tread ply 3 are oriented at an angle α of +23° with respect to the circumferential direction. The angles are represented only approximately in the drawing. In this case, the optimum value of the cord angle α is +40.5°.

Figure 4:
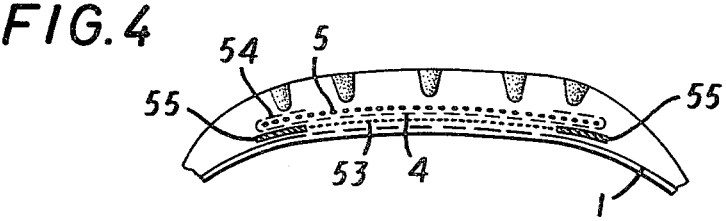
FIG. 4 is a fragmentary radial section of another embodiment of a tire in accordance with the invention.
Figure 5:
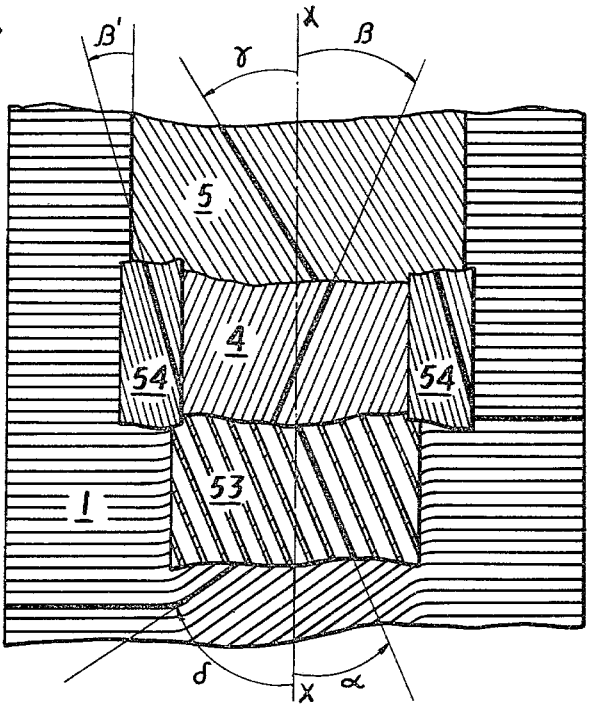
FIG. 5 is a developed plan view of a sector of the reinforcement of the tire of FIG. 4.

In FIGS. 4 and 5 the numbers of the various parts are the same as the numbers of the corresponding parts in FIGS. 2 and 3. The tire in accordance with the invention which is shown in FIGS. 4 and 5 has a tread reinforcement that comprises a ply 53 (of cord angle α) adjacent the carcass ply which is narrower than the other plies 4 and 5 of the tread reinforcement. Furthermore, the ply 5 (of cord angle β) is included within the edges 54 of the underlying ply 4 (of cord angle β). Preferably two narrow bands of rubber 55 are arranged on opposite sides of the narrower ply 53.

A tire such as that shown diagrammatically in FIGS. 4 and 5 of size 165-380 was made from the following reinforcement parts:

a carcass ply: polyamide cords 1880/2 (118 cords per decimeter), placed on the building drum at −80°; distance between bead wires 366 mm;

first tread ply 53: rayon cords 1840/2 (50 cords per decimeter); width 162 mm; cord angle +38°;

rubber belts 55: width 27 mm;

second tread ply 4: polyvinyl alcohol cords 1330/2/2 (54 cords per decimeter); width 340 mm; cord angle −31°;

third thread ply 5: steel cords, four strands of 23/100 mm plus one hooping wire (63 cords per decimeter); width 210 mm; cord angle +73°.

The edges 54 of the second tread ply 4 were folded over the third tread ply 5 and thereupon the reinforcement assembly was covered with sidewall trim and a rubber belt and with a tread and then shaped with a shaping ratio of 1.5, which means that the diameter of the shape tire was equal to 1.5 times the diameter of the cylindrical blank.

After the shaping, the cord angles in the region of the tread were as follows:

carcass ply: −55.5° ($\delta$)
first ply of the tread: +23° ($\alpha$)
second ply of the tread: −16° ($\beta$)
third ply of the tread: +31° ($\gamma$)

In this embodiment, the ratio $$\frac{|\tan \alpha| + |\tan \delta|}{|\tan \beta| + |\tan \gamma|}$$

before the shaping is equal to 1.7.

Figure 6:
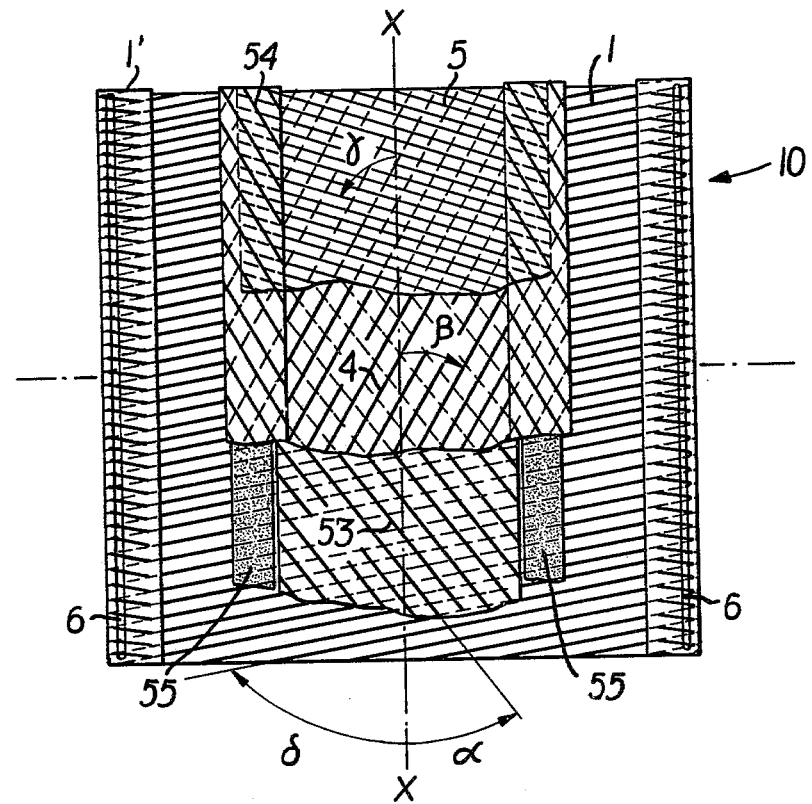
FIG. 6 is a front view of a cylindrical tire blank, the reinforcement cords of which are shown schematically and drawn as if the view were developed.

For clarity, FIG. 6 has been drawn as though the elastomer in which the cords of the various plies have been calendered were transparent. The cords shown in dashes are those of the cord ply located immediately under the cords shown in full lines.

Figure 7:
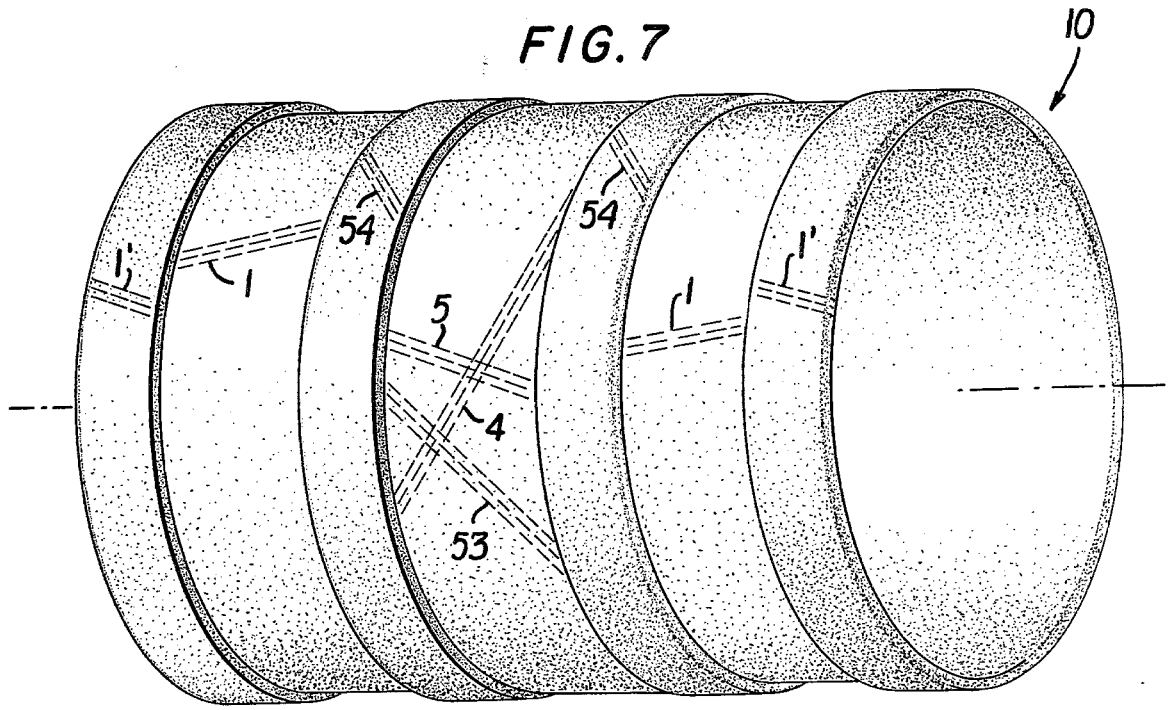
FIG. 7 is a perspective view, on a somewhat larger scale, of the tire blank shown in FIG. 6.

In FIGS. 6 and 7 the reference numerals and letters used are those already used in describing the tire shown in FIGS. 4 and 5.

The angles $\alpha$, $\beta$, $\gamma$ and $\delta$ are those given above in the description of the tire shown diagrammatically in FIGS. 4 and 5 of size 165-380.

The cylindrical tire blank 10 shown in FIGS. 6 and 7 comprises:

(i) a carcass ply 1 the ends 1' of which are turned up about annular bead wires 6 located each in an end portion of the blank which will become the bead of the finished tire;

(ii) a first tread ply 53, having on each side thereof a rubber belt 55 devoid of a cord reinforcement; and (iii) a second tread ply 4 the side portions 54 of which have been folded over the edge portions of (iv) a third tread ply 5.

Thus there is provided in accordance with the invention novel and highly-effective pneumatic tires for vehicles. Those skilled in the art will understand that the invention includes embodiments in addition to the representative ones disclosed above and is as broad as the appended claims and their equivalents.

I claim:

1. A cylindrical blank for the one-step manufacture of a pneumatic tire characterized by the fact that it comprises at least one carcass ply having cords which are continuous from one bead to the other and which form a substantially constant angle of between 70° and 90° with respect to the circumferential direction, as well as a tread reinforcement consisting essentially of three tread plies radially outside the carcass ply adjacently superimposed on one another and on the carcass ply and having cords whose respective cord angles $\alpha$, $\beta$ and $\gamma$ are such that, $\alpha$ being the angle of the cords of the tread ply nearest the carcass ply, when the angles $\beta$ and $\gamma$ of the other two tread plies are of opposite sign and when in absolute value the angle $\beta$ is greater than the angle $\gamma$, the expression $$\left| \frac{|\tan \beta| - |\tan \gamma| - 2|\tan \alpha| \cdot |\tan \beta| \cdot |\tan \gamma|}{2|\tan \beta| \cdot |\tan \gamma| + |\tan \alpha|(|\tan \beta| - |\tan \gamma|)} \right| \leq 0.6$$

is satisfied;

when the angles $\beta$ and $\gamma$ of the other two tread plies are of the opposite sign and when, in absolute value, the angle $\gamma$ is greater than the angle $\beta$, the expression $$\left| \frac{|\tan \gamma| - |\tan \beta| - 2|\tan \alpha| \cdot |\tan \beta| \cdot |\tan \gamma|}{2|\tan \beta| \cdot |\tan \gamma| + |\tan \alpha|(|\tan \gamma| - |\tan \beta|)} \right| \leq 0.6$$

is satisfied; and when the angles $\beta$ and $\gamma$ of the other two tread plies are of the same sign, the expression $$\left| \frac{|\tan \beta| + |\tan \gamma| - 2|\tan \alpha| \cdot |\tan \beta| \cdot |\tan \gamma|}{2|\tan \beta| \cdot |\tan \gamma| + |\tan \alpha|(|\tan \beta| + |\tan \gamma|)} \right| \leq 0.6$$

is satisfied, whereby said three tread plies can be expanded radially and said cylindrical blank can be reshaped to a substantially toroidal shape, notwithstanding the positioning thereon of said three tread plies.

2. A cylindrical blank according to claim 1 wherein the cords of the carcass ply form an angle $\delta$ with the circumferential direction in the region of the tread plies, the cord angle $\delta$ being such that the expression $$\frac{|\tan \alpha| + |\tan \delta|}{|\tan \beta| + |\tan \gamma|};$$

is at least equal to 1.

3. A cylindrical blank according to claim 1 wherein the cords of the carcass ply form an angle $\delta$ with the circumferential direction in the region of the tread plies, the cord angle $\delta$ being such that the expression $$\frac{|\tan \alpha| + |\tan \delta|}{|\tan \beta| + |\tan \gamma|};$$

is between 1 and 4.

4. A cylindrical blank according to claim 1 comprising means reinforcing the edges of the tread reinforcement.

5. A cylindrical blank according to claim 1 wherein the cords of the tread ply nearest the carcass ply have a total cross sectional area per unit of ply width which is less than that of the cords of the other plies present in the region of the tread.

6. A cylindrical blank according to claim 1 wherein the tread ply nearest the carcass ply is narrower than the other two tread plies.

7. A cylindrical blank according to claim 6 wherein the width of the tread ply nearest the carcass ply is between 50% and 90% of the average width of the other two tread plies.

8. A cylindrical blank according to claim 7 wherein the width of the tread ply nearest the carcass ply is between 70% and 75% of the average width of the other two tread plies.

9. A cylindrical blank according to claim 6 comprising rubber inserts between the carcass ply and the portion of the other two tread plies that overhang the treat ply nearest the carcass ply.

10. A cylindrical blank for the one-step manufacture of a pneumatic tire, characterized by the fact that it comprises at least one carcass ply with cords which are continuous from one bead to the other and which form a substantially constant angle of between 70° and 90° with respect to the circumferential direction, as well as a tread reinforcement consisting essentially of three tread plies radially outside the carcass ply adjacently superimposed on one another and on the carcass ply and having cords whose respective cord angles are $\alpha$, $\beta$ and $\gamma$, the angle $\alpha$ of the cords of the tread ply nearest the carcass ply being such that when the angles $\beta$ and $\gamma$ of the two other tread plies are of opposite sign and when, in absolute value, the angle $\beta$ is greater than the angle $\gamma$, $$\tan \alpha = \epsilon \frac{|\tan \beta| - |\tan \gamma|}{2|\tan \beta| \cdot |\tan \gamma|},$$

with $\epsilon = +1$ when the angle $\beta$ is positive and $\epsilon = -1$ when the angle $\beta$ is negative with respect to the longitudinal direction;

when the angles $\beta$ and $\gamma$ of the other two tread plies are of opposite sign and when, in absolute value, the angle $\gamma$ is greater than the angle $\beta$, $$\tan \alpha = \epsilon \frac{|\tan \gamma| - |\tan \beta|}{2|\tan \beta| \cdot |\tan \gamma|},$$

with $\epsilon = +1$ when the angle $\gamma$ is positive and $\epsilon = -1$ when the angle $\gamma$ is negative with respect to the circumferential direction; and when the angles $\beta$ and $\gamma$ of the other two tread plies are of the same sign, $$\tan \alpha = \epsilon \frac{|\tan \beta| + |\tan \gamma|}{2|\tan \beta| \cdot |\tan \gamma|},$$

with $\epsilon = -1$ when the angles $\beta$ and $\gamma$ are positive and $\epsilon = +1$ when $\beta$ and $\gamma$ are negative with respect to the circumferential direction, whereby said three tread plies can be expanded radially and said cylindrical blank can be reshaped to a substantially toroidal shape, notwithstanding the positioning thereon of said three tread plies.

* * * * *

UNITED STATES PATENT AND TRADEMARK OFFICE
CERTIFICATE OF CORRECTION

PATENT NO. : 4,286,645
DATED : September 1, 1981
INVENTOR(S) : JACQUES BOILEAU

It is certified that error appears in the above—identified patent and that said Letters Patent is hereby corrected as shown below:

Col. 3, line 47, ";" should read -- $\geq$ --; line 51, after "expression" insert $$-- \frac{|\tan \alpha| + |\tan \delta|}{|\tan \beta| + |\tan \gamma|} --.$$

Col. 4, line 7, "embodiment" should read -- embodiments --; line 22, "1E" should read -- 1H --. Col. 5, line 35, "-1" should read -- +1 --. Col. 8, line 19, before "opposite" delete "the". Col. 9, line 13, "treat" should read -- tread --.

Signed and Sealed this

Twelfth Day of January 1982

[SEAL]

Attest:

GERALD J. MOSSINGHOFF

Attesting Officer

Commissioner of Patents and Trademarks